(12) United States Patent
Sato et al.

(10) Patent No.: US 9,341,777 B2
(45) Date of Patent: May 17, 2016

(54) OPTICAL FIBER FUSION SPLICER

(75) Inventors: Ryuichiro Sato, Yokohama (JP);
Hiroshi Takayanagi, Yokohama (JP);
Makoto Miyamori, Yokohama (JP)

(73) Assignee: SEI OPTIFRONTIER CO., LTD.,
Yokohama-shi, Kanagawa (JP)

( * ) Notice: Subject to any disclaimer, the term of this patent is extended or adjusted under 35 U.S.C. 154(b) by 163 days.

(21) Appl. No.: 14/128,129

(22) PCT Filed: Jun. 28, 2012

(86) PCT No.: PCT/JP2012/066558
§ 371 (c)(1),
(2), (4) Date: Dec. 20, 2013

(87) PCT Pub. No.: WO2013/005640
PCT Pub. Date: Jan. 10, 2013

(65) Prior Publication Data
US 2014/0131326 A1 May 15, 2014

(30) Foreign Application Priority Data

Jul. 1, 2011 (JP) ................................. 2011-147320

(51) Int. Cl.
*B23K 10/00* (2006.01)
*G02B 6/255* (2006.01)
*G02B 6/36* (2006.01)

(52) U.S. Cl.
CPC ............ *G02B 6/2553* (2013.01); *G02B 6/2557* (2013.01); *G02B 6/3616* (2013.01); *G02B 6/3652* (2013.01)

(58) Field of Classification Search
CPC .. G02B 6/2553; G02B 6/2557; G02B 6/3616;
G02B 6/3652; G02B 6/2551; G02B 6/2555;
G02B 6/2556; H05B 1/02; H05B 1/023;
H05B 1/026
USPC .................. 219/121.45, 121.46, 383, 121.52;
385/96–98; 65/501
See application file for complete search history.

(56) References Cited

U.S. PATENT DOCUMENTS

| 5,481,640 | A | * | 1/1996 | Harman | ............... G02B 6/2551 |
| | | | | | 219/383 |
| 2002/0064355 | A1 | * | 5/2002 | Ware | ..................... G02B 6/245 |
| | | | | | 385/95 |
| 2007/0053648 | A1 | * | 3/2007 | Sasaki | ................. G02B 6/3636 |
| | | | | | 385/137 |

FOREIGN PATENT DOCUMENTS

| CN | 101833139 | 9/2010 |
| JP | S56-37523 B2 | 9/1981 |
| JP | S63-58306 A | 3/1988 |
| JP | H1-159605 | 6/1989 |
| JP | H02-89009 A | 3/1990 |
| JP | H06-160662 A | 6/1994 |
| JP | 2000-019338 A | 1/2000 |
| JP | 2000-241652 A | 9/2000 |
| JP | 2002-072003 A | 3/2002 |
| JP | 2005-189770 A | 7/2005 |
| WO | WO-2012/101750 A1 | 8/2012 |

* cited by examiner

*Primary Examiner* — Mark Paschall
(74) *Attorney, Agent, or Firm* — Drinker Biddle & Reath LLP (57) ABSTRACT

An optical fiber fusion splicer includes a base having a fiber groove for containing an optical fiber, a fiber clamp for pressing the optical fiber contained in the fiber groove against the base and load changing means for changing a load for the fiber clamp to press the optical fiber.

14 Claims, 7 Drawing Sheets

OPTICAL FIBER FUSION SPLICER

TECHNICAL FIELD

The present invention relates to an optical fiber fusion splicer for fusion-splicing leading ends of optical fibers to each other.

BACKGROUND ART

Optical fiber fusion splicers fusion-splice leading ends of optical fibers to each other while fusing them by electric discharge. Known as a conventional optical fiber fusion splicer is one comprising an optical fiber mounting part having a plurality of V-shaped grooves for mounting optical fibers and a fiber clamp part for pressing the optical fibers against the optical fiber mounting part as described in Patent Literature 1, for example.

CITATION LIST

Patent Literature

Patent Literature 1: Japanese Patent Application Laid-Open No. 2005-189770

SUMMARY OF INVENTION

Technical Problem

However, the following problem exists in the conventional art mentioned above. That is, the fiber clamp part presses the optical fibers under a fixed load and thus may fail to do it optimally under some circumstances. Specifically, under a circumstance where the fiber clamp part presses only one optical fiber, the optical fiber will be likely to buckle if the fiber clamp part presses the optical fiber under a too-heavy load. Under a circumstance where the fiber clamp part presses a plurality of optical fibers, on the other hand, the optical fibers will be apt to misalign their axes if the fiber clamp part presses the optical fiber under a too-light load.

It is an object of the present invention to provide an optical fiber fusion splicer which enables a fiber clamp to press optical fibers against a base always appropriately.

Solution to Problem

The optical fiber fusion splicer of the present invention is an optical fiber fusion splicer for fusion-splicing optical fibers to each other. The optical fiber fusion splicer comprises a base having a fiber groove for containing an optical fiber, a fiber clamp for pressing the optical fiber contained in the fiber groove against the base, and load changing means for changing a load for the fiber clamp to press the optical fiber.

Thus, by providing the load changing means for changing the load for the fiber clamp to press the optical fiber, the optical fiber fusion splicer of the present invention can change the load for pressing the optical fiber appropriately according to circumstances. For example, under a circumstance where the fiber clamp presses only one optical fiber when the base has a plurality of fiber grooves, the load for the fiber clamp to press the optical fiber is set lighter in order to prevent the optical fiber from buckling. Under a circumstance where the fiber clamp presses a plurality of optical fibers, on the other hand, the load for the fiber clamp to press the optical fibers is set heavier in order to prevent the optical fibers from misaligning their axes. Hence, the fiber clamp can press the optical fibers against the base always appropriately.

The load changing means may have a clamp block joined to the fiber clamp so as to be movable vertically, a block moving unit for moving the clamp block vertically, and a load imparting member for providing the fiber clamp with a load corresponding to a height position of the clamp block.

When the block moving unit moves the clamp block upward with respect to the fiber clamp in such a structure, the load applied to the fiber clamp becomes lighter, thereby lowering the load for the fiber clamp to press the optical fiber. When the block moving unit moves the clamp block downward with respect to the fiber clamp, on the other hand, the load applied to the fiber clamp becomes heavier, thereby enhancing the load for the fiber clamp to press the optical fiber. Thus, the load for the fiber clamp to press the optical fiber can be changed according to the height position of the clamp block.

The block moving unit may have a pushup pin for pushing up the clamp block and a drive part for moving the pushup pin vertically.

When the drive part causes the pushup pin to ascend in such a structure, the pushup pin pushes up the clamp block, whereby the clamp block moves upward with respect to the fiber clamp. When the drive part causes the pushup pin to descend, on the other hand, the clamp block moves downward with respect to the fiber clamp. Thus, the block moving unit can be actualized in a simple structure.

The load imparting member may be a spring arranged between the fiber clamp and the clamp block.

Moving the clamp block upward with respect to the fiber clamp in such a structure elongates the spring, thereby lowering the load (spring load) applied to the fiber clamp by the spring. On the other hand, moving the clamp block downward with respect to the fiber clamp shortens the spring, thereby enhancing the load applied to the fiber clamp by the spring. Thus, when the load imparting member is constituted by the spring, the load applied to the fiber clamp can easily be changed according to the height position of the clamp block.

Advantageous Effects of Invention

The present invention enables the fiber clamp to press optical fibers against the base always appropriately. This can prevent the optical fibers from buckling and misaligning their axes, for example, thereby making it possible to fusion-splice the optical fibers to each other with low loss.

DESCRIPTION OF EMBODIMENTS

In the following, embodiments of the optical fiber fusion splicer in accordance with the present invention will be explained in detail with reference to the drawings.

Figure 1:
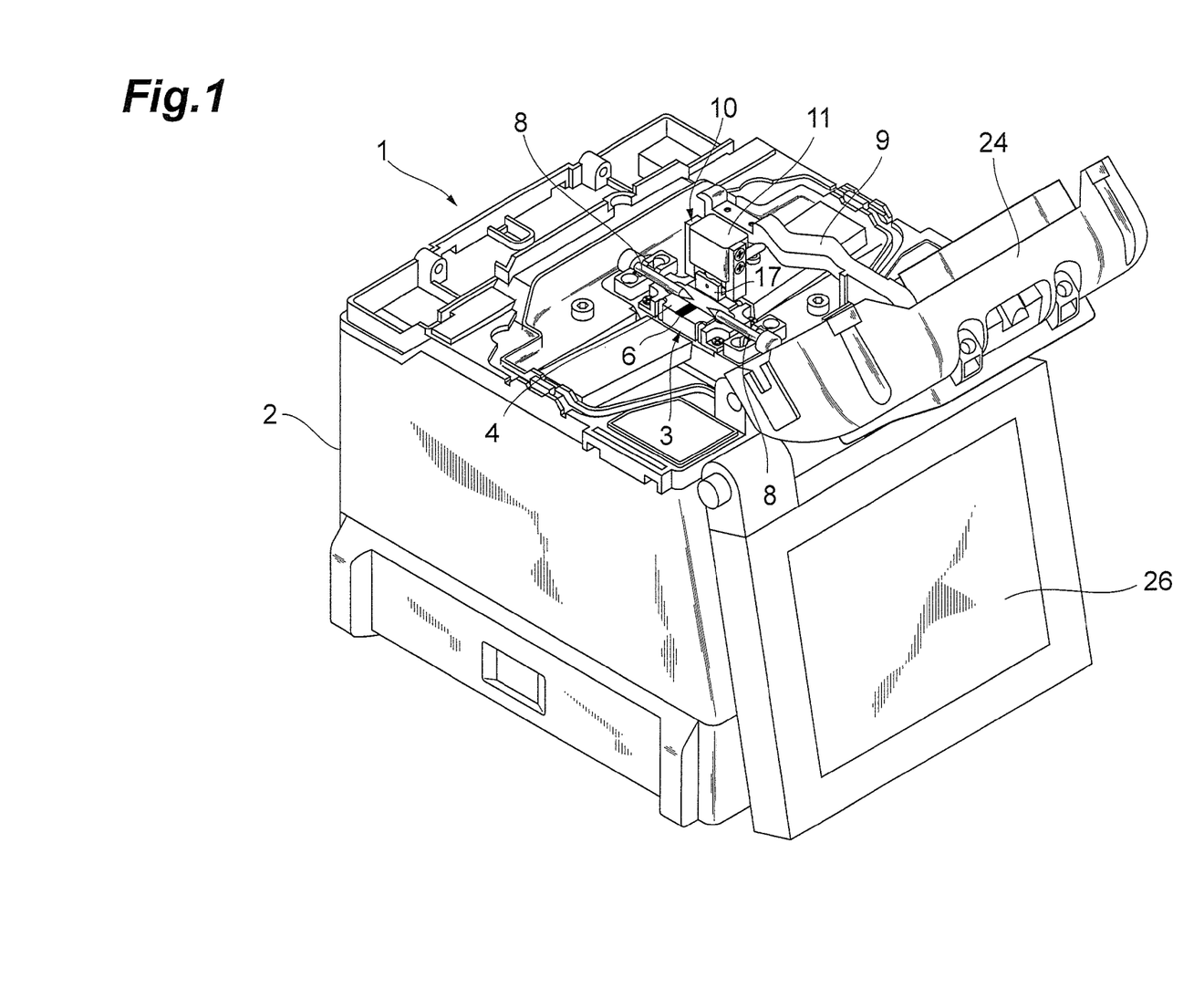
FIG. 1 is a perspective view illustrating the exterior of one embodiment of the optical fiber fusion splicer in accordance with the present invention.

FIG. 1 is a perspective view illustrating the exterior of one embodiment of the optical fiber fusion splicer in accordance with the present invention. In FIG. 1, the optical fiber fusion splicer 1 of this embodiment is equipped with a box-shaped housing 2. A base 3 for fusing is disposed on the upper part of the housing 2.

Figure 2:
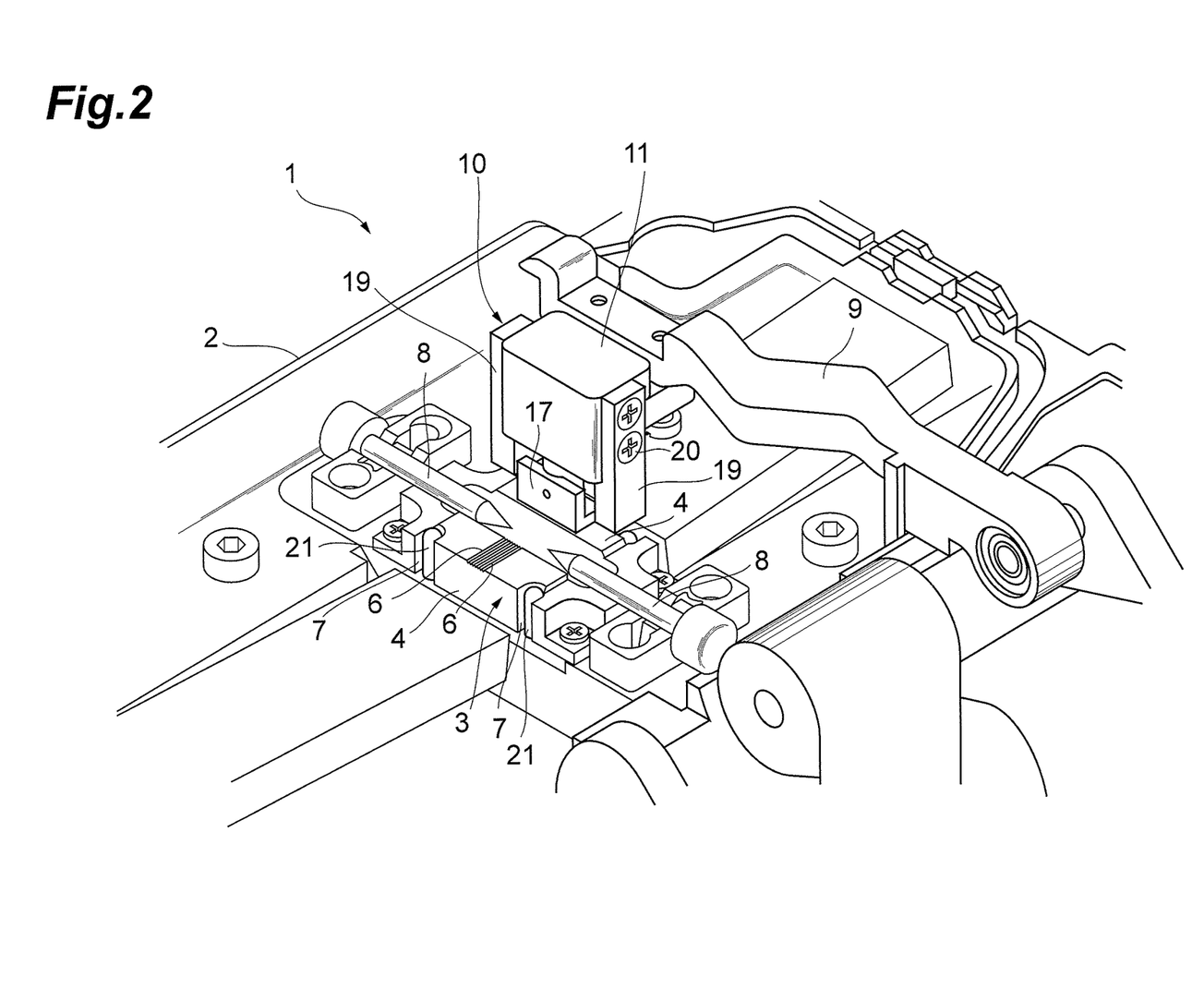
FIG. 2 is an enlarged perspective view of a main part of the optical fiber fusion splicer illustrated in FIG. 1.
Figure 3:
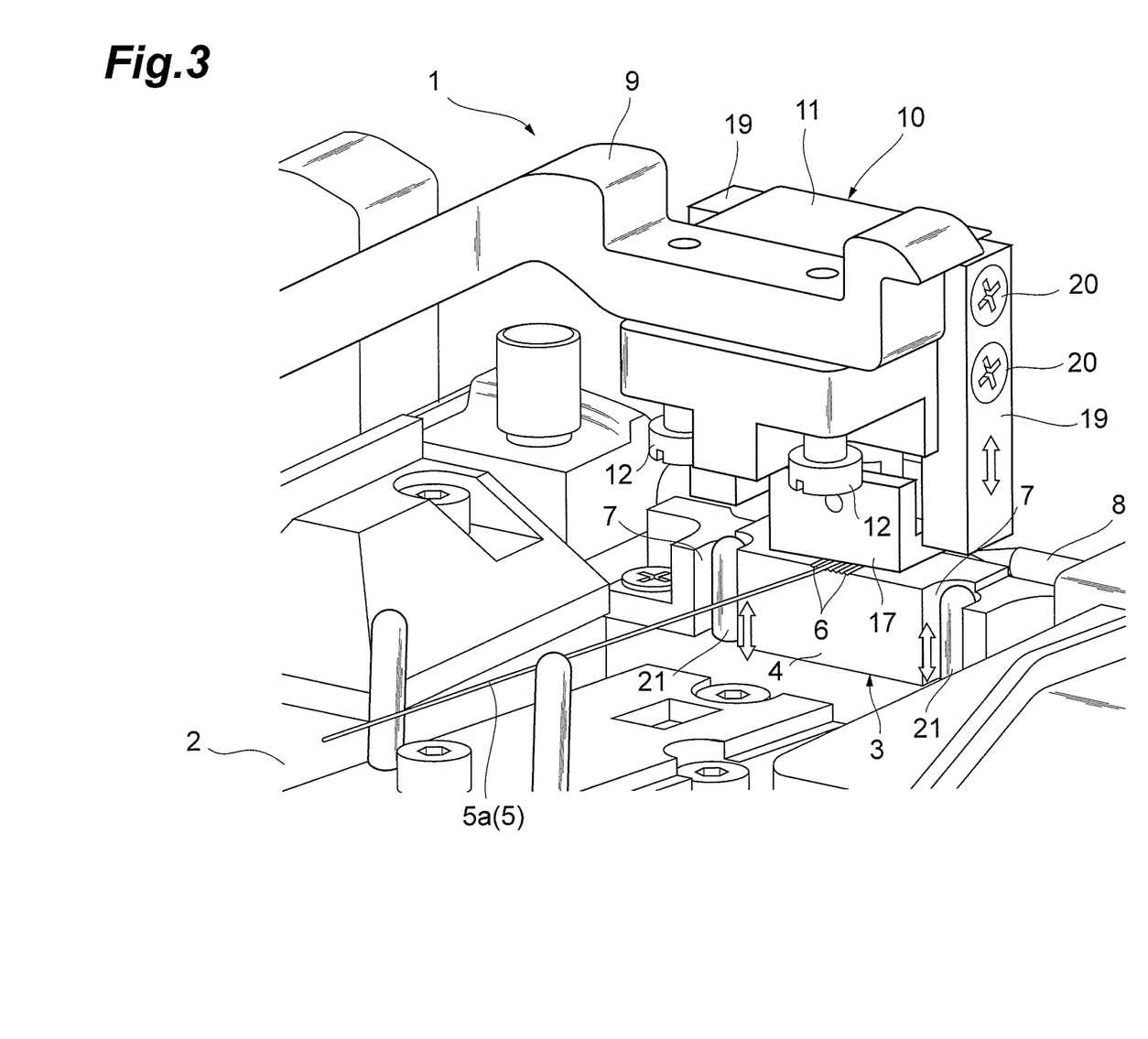
FIG. 3 is a perspective view illustrating a state where an optical fiber is clamped by a fiber clamp member depicted in FIG. 2.

As illustrated in FIGS. 2 and 3, the base 3 has a pair of fiber positioning parts 4 arranged so as to oppose each other. The fiber positioning parts 4 position bare fibers 5a (see FIG. 5) exposed by removing coatings from leading end parts of optical fibers 5. The upper face of each fiber positioning part 4 is formed with a plurality of fiber grooves 6, each having a V-shaped cross section, for positioning and containing the bare fibers 5a.

Each fiber positioning part 4 is formed with two concave cutouts 7 for inserting therethrough pushup pins 21 (which will be explained later) in the thickness direction of the base 3. The concave cutouts 7 are formed at respective positions interposing the fiber grooves 6 therebetween.

A pair of discharge electrodes 8 for fusing the leading ends of the bare fibers 5a to each other by arc discharge are arranged so as to oppose each other between the fiber positioning parts 4.

A pair of clamp arms 9 (only one of which is depicted in FIGS. 1 and 2) are rotatably joined to the upper part of the housing 2. Fiber clamp members 10 for clamping the bare fibers 5a positioned by the fiber positioning parts 4 are attached to respective leading end parts of the clamp arms 9.

Figure 4:
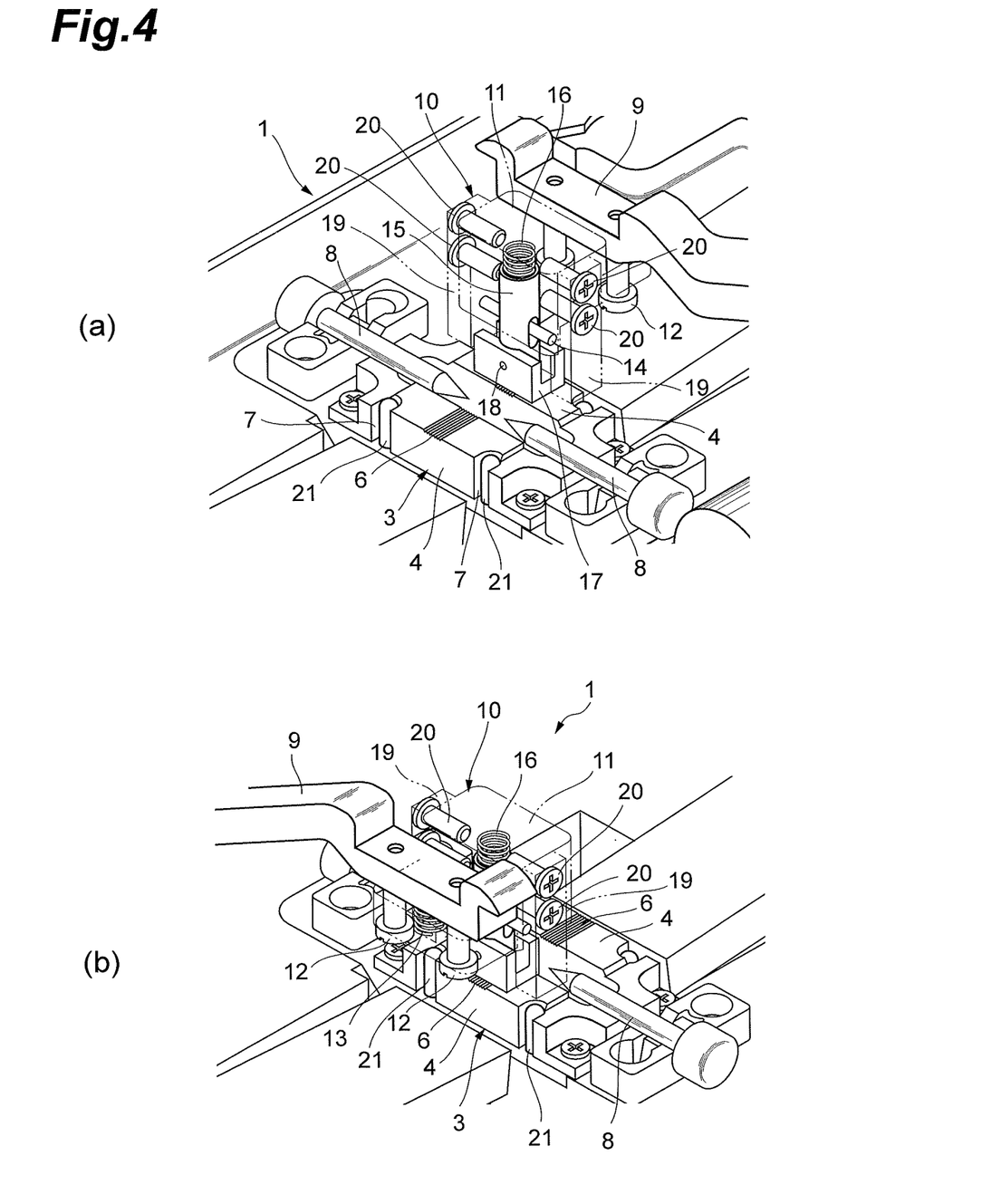
FIG. 4 is a set of perspective views illustrating an inner structure of a clamp block depicted in FIG. 2.
Figure 5:
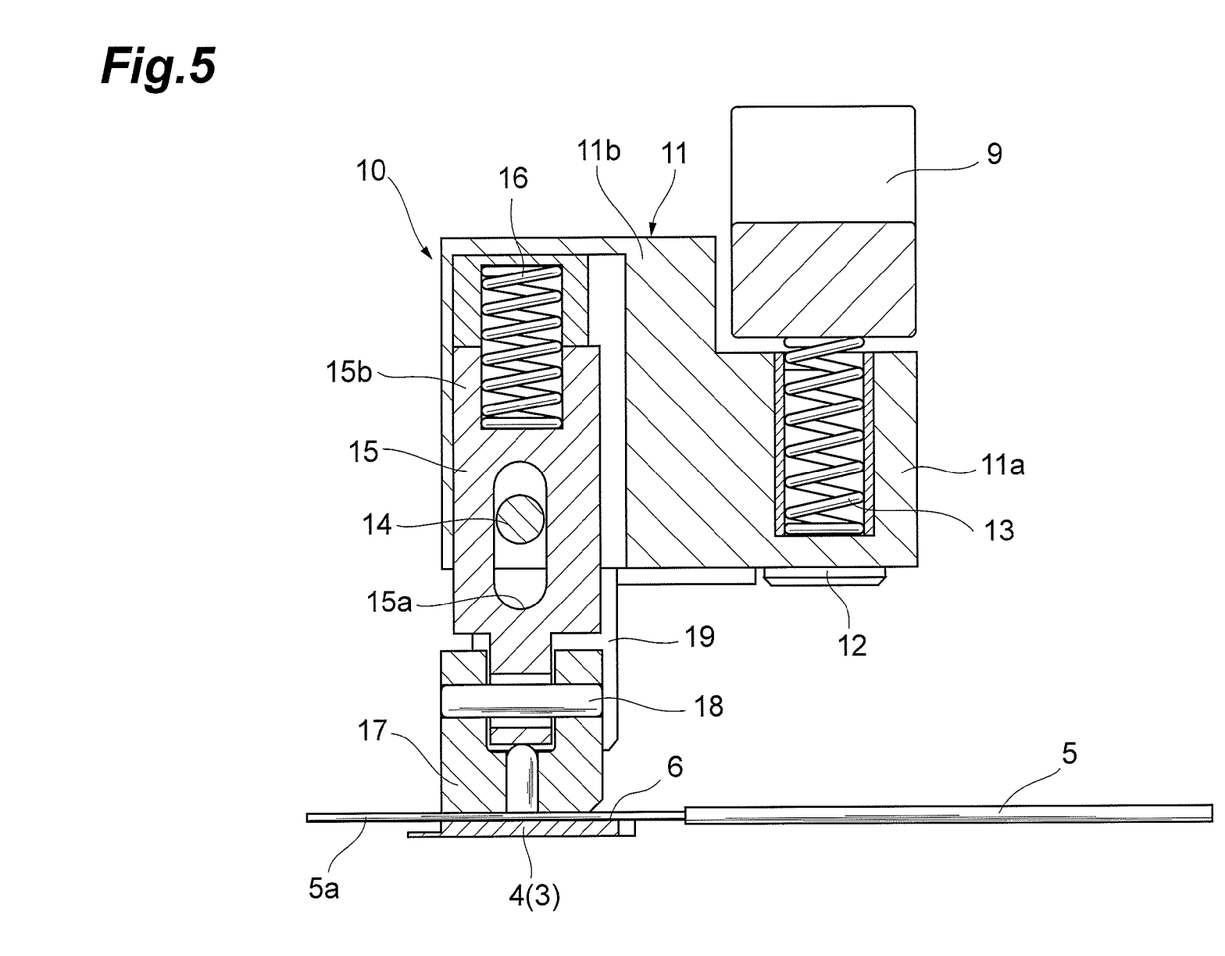
FIG. 5 is a sectional view of the fiber clamp member depicted in FIG. 2.

As illustrated in FIGS. 4 and 5, each fiber clamp member 10 has a clamp block 11 joined to the leading end part of the clamp arm 9. The clamp block 11 is constituted by a block joint 11a and a block body 11b located on the base 3 side of the block joint 11a. The block body 11b is placed at a position higher than that of the block joint 11a.

Two guide pins 12 are secured to the lower face of the leading end part of each clamp arm 9. The block joint 11a is supported by the guide pins 12 so as to be vertically movable. A clamp block spring 13 is disposed within the block joint 11a. The clamp block spring 13 has one end part in contact with the inner wall face of the lower part of the block joint 11a and the other end part in contact with the lower face of the leading end part of the clamp arm 9.

A support pin 14 extending in the opposing direction of the discharge electrodes 8 is disposed within the block body 11b. A clamp auxiliary 15 is supported by the support pin 14 so as to be vertically movable. The clamp auxiliary 15 is formed with a through hole 15a for inserting therethrough the support pin 14. The through hole 15a has a vertically elongated cross section. This allows the clamp auxiliary 15 to move vertically with respect to the clamp block 11.

A clamp spring 16 is disposed within the block body 11b. The clamp spring 16 has one end part in contact with the bottom face of a cylindrical part 15b disposed in the upper part of the clamp auxiliary 15 and the other end part in contact with the inner wall face of the upper part of the block body 11b.

A fiber clamp 17 having a U-shaped cross section is joined to the lower part of the clamp auxiliary 15 through a joint pin 18. The fiber clamp 17 presses the bare fibers 5a contained in the fiber grooves 6 of the base 3 against the base 3. The clamp block 11 and the clamp auxiliary 15 are vertically movable relative to each other. Therefore, the clamp block 11 can move vertically with respect to the fiber clamp 17 through the clamp auxiliary 15. A rubber piece (not depicted) serving as a cushioning material is secured to the lower face of the fiber clamp 17.

Side plates 19 are attached to both side faces of the block body 11b each with two screws 20. Each side plate 19 extends from the upper face of the block body 11b to a part at substantially the center in the thickness direction of the fiber clamp 17.

Figure 6:
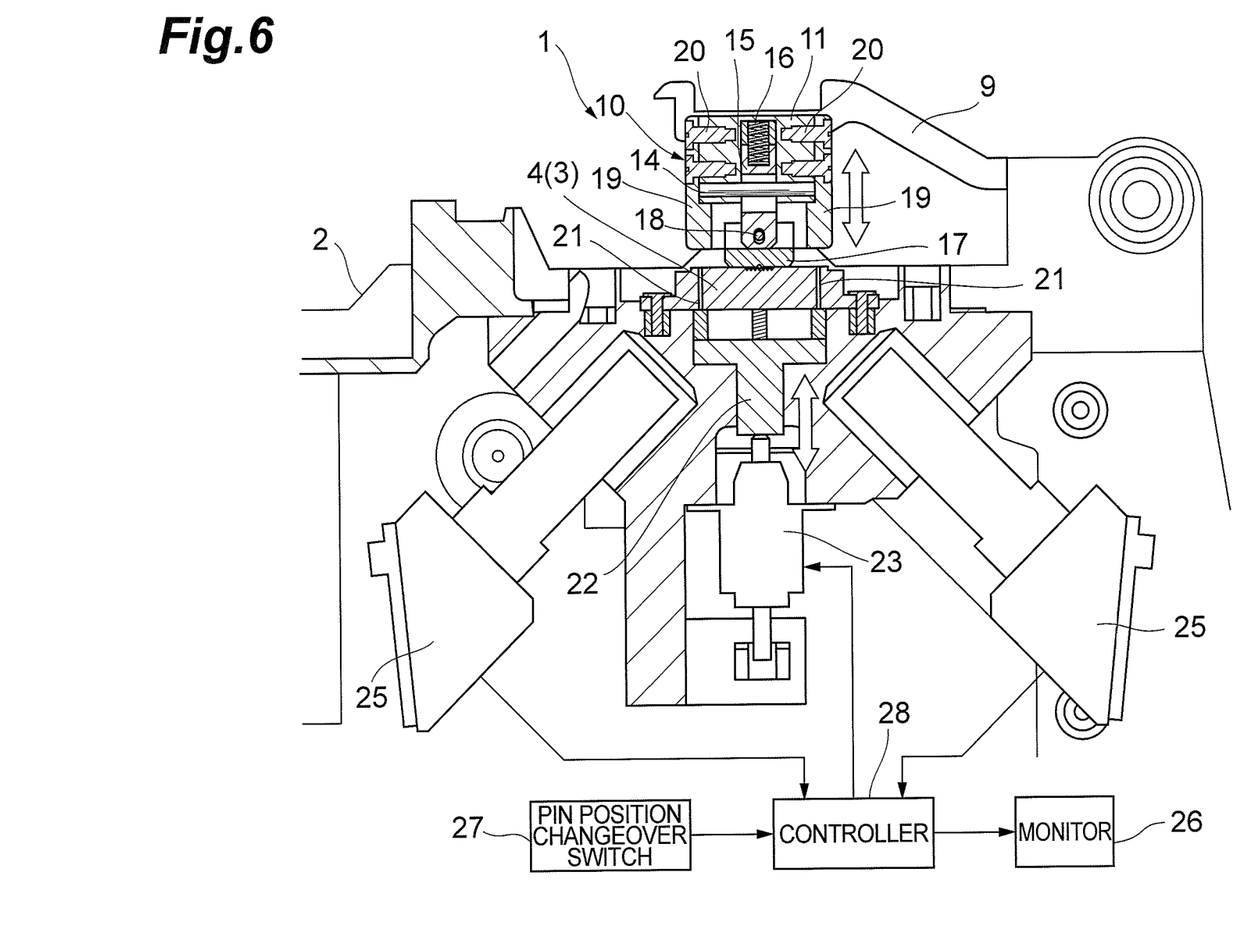
FIG. 6 is a sectional view of the optical fiber fusion splicer illustrated in FIG. 1.

The pushup pins 21 adapted to engage the side plates 19 and push up the clamp block 11 are arranged directly below the side plates 19, respectively. As illustrated in FIG. 6, the pushup pins 21 are provided so as to project from the upper face of a pin base 22. The pin base 22 is moved vertically by a drive unit 23. The drive unit 23 has a drive motor and a mechanism for transforming a rotational movement of the drive motor into a linear movement (vertical movement), which are not illustrated in particular.

Returning to FIG. 1, the base 3, discharge electrodes 8, clamp arms 9, and fiber clamp members 10 are covered with a windshield cover 24 which is openable and closable. The windshield cover 24 is rotatable through the same axis as with the clamp arms 9.

As illustrated in FIG. 6, two cameras 25 for capturing the states of positioning and fusing the optical fibers 5 are arranged within the housing 2. As illustrated in FIG. 1, a monitor 26 for displaying the states of positioning and fusion-splicing the optical fibers 5 as captured by the cameras 25 is arranged on one side face of the housing 2.

As illustrated in FIG. 6, the optical fiber fusion splicer 1 also comprises a pin position changeover switch 27 and a controller 28. For example, the pin position changeover switch 27 is disposed on a side face of the housing 2, while the controller 28 is disposed within the housing 2.

The pin position changeover switch 27 is a switch for selecting between a pin position for a single core and a pin position for multiple cores. The pin position for the single core is the height position of the pushup pins 21 at the time when only one optical fiber 5 is positioned at the fiber positioning part 4 of the base 3 (see FIG. 7(a)). The pin position for the multiple cores is the height position of the pushup pins 21 at the time when a plurality of optical fibers 5 are positioned at the fiber positioning part 4 of the base 3 (see FIG. 7(b)). The pin position for the single core is set higher than that for the multiple cores.

The controller 28 performs image processing of the images captured by the cameras 25 and causes the monitor 26 to display them, while controlling the drive unit 23 so as to move the pin base 22 vertically according to the signal selected by the pin position changeover switch 27.

Figure 7:
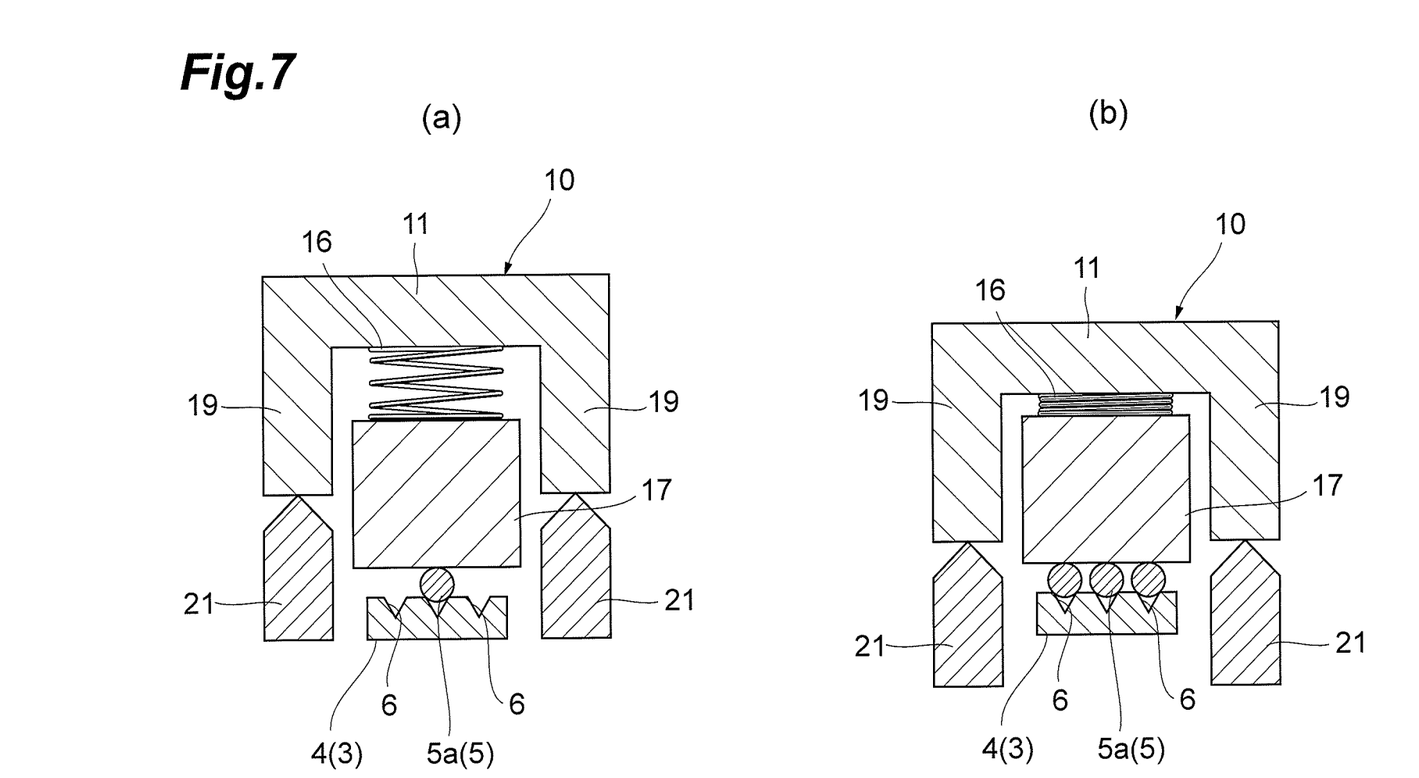
FIG. 7 is a set of imaginary views illustrating that the load for the fiber clamp depicted in FIG. 2 to press optical fibers varies depending on the number of optical fibers pressed by the fiber clamp.

When the bare fiber 5a is pressed by the fiber clamp 17 in a state where only one optical fiber 5 is positioned at the fiber positioning part 4, i.e., the bare fiber 5a is contained in only one of the plurality of fiber grooves 6, as illustrated in FIG. 7(a) in thus constructed optical fiber fusion splicer 1, the pin position changeover switch 27 selects the pin position for the single core. Then, the controller 28 controls the drive unit 23 such that the pin base 22 reaches a height position corresponding to the pin position for the single core. At this time, the pushup pins 21 abut against the respective lower faces of the side plates 19 and push up the clamp block 11, whereby the clamp block 11 ascends. This elongates the clamp spring 16 biasing the fiber clamp 17, so as to reduce the spring load applied to the fiber clamp 17, thereby lowering the load for the fiber clamp 17 to press the bare fiber 5a.

When a plurality of bare fibers 5a are pressed by the fiber clamp 17 in a state where a plurality of optical fibers 5 are positioned at the fiber positioning part 4, i.e., the bare fibers 5a are contained in a plurality of fiber grooves 6, as illustrated in FIG. 7(b), on the other hand, the pin position changeover switch 27 selects the pin position for the multiple cores. Then, the controller 28 controls the drive unit 23 such that the pin base 22 reaches a height position corresponding to the pin position for the multiple cores. At this time, the clamp block 11 hardly ascends even when the pushup pins 21 abut against the lower faces of the side plates 19. Therefore, the clamp spring 16 biasing the fiber clamp 17 is short, so as to increase the spring load applied to the fiber clamp 17, thereby enhancing the load for the fiber clamp 17 to press the bare fibers 5a.

In the foregoing, the clamp block 11, support pin 14, clamp auxiliary 15, clamp spring 16, joint pin 18, side plates 19, pushup pins 21, pin base 22, and drive unit 23 constitute load changing means for changing the load for the fiber clamp 17 to press the optical fibers 5.

At this time, the side plates 19, pushup pins 21, pin base 22, and drive unit 23 constitute a block moving unit for moving the clamp block 11 vertically. The clamp spring 16 constitutes a load imparting member for providing the fiber clamp 17 with a load corresponding to the height position of the clamp block 11.

Thus, when the fiber clamp 17 presses only one optical fiber 5 against the base 3 in this embodiment, the height position of the clamp block 11 is raised with respect to the fiber clamp 17, so as to reduce the load for the fiber clamp 17 to press the bare fiber 5a, thereby preventing the bare fiber 5a from buckling and breaking. On the other hand, when the fiber clamp 17 presses a plurality of optical fibers 5 against the base 3, the height position of the clamp block 11 is lowered with respect to the fiber clamp 17, so as to enhance the load for the fiber clamp 17 to press the bare fibers 5a, thereby preventing the bare fibers 5a from misaligning their axes with respect to the fiber grooves 6.

Thus, the load for the fiber clamp 17 to press the optical fibers 5 is changed depending on whether one or a plurality of optical fibers 5 are pressed, whereby the optical fibers 5 can always be pressed appropriately regardless of the number of optical fibers 5. This can prevent the splicing loss from worsening after fusion-splicing the optical fibers 5 to each other.

The present invention is not limited to the above-mentioned embodiment. For example, while the above-mentioned embodiment provides the pin position changeover switch 27 for selecting between the pin position for the single core and the pin position for the multiple cores, the number of optical fibers 5 pressed by the fiber clamp 17 can be determined from the images captured by the cameras 25. Therefore, without providing the pin position changeover switch 27, the controller 28 may automatically discern according to the images captured by the cameras 25 whether one or a plurality of optical fibers 5 are pressed, so as to control the drive unit 23 in response to the result of discernment.

While the above-mentioned embodiment sets the load for pressing the optical fiber 5 lighter when pressing only one optical fiber 5, and sets the load for pressing the optical fiber 5 heavier when pressing a plurality of optical fibers 5, the technique for setting the load for pressing the optical fibers 5 is not limited thereto in particular. For example, the load for pressing the optical fibers 5 may be set so as to become heavier continuously or intermittently as the number of optical fibers 5 pressed by the fiber clamp 17 increases. In this case, the drive unit 23 may be driven manually so as to adjust the height position of the clamp block 11, or the number of optical fibers 5 pressed by the fiber clamp 17 may be detected automatically according to the images captured by the cameras 25, so as to control the drive unit 23 in response to the result of detection, thereby adjusting the height position of the clamp block 11.

While the above-mentioned embodiment arranges the clamp spring 16 between the clamp block 11 and the clamp auxiliary 15 so as to change the load (spring load) of the clamp spring 16 on the fiber clamp 17 according to the height position of the clamp block 11, the load imparting member for providing the fiber clamp 17 with the load corresponding to the height position of the clamp block 11 is not limited to the spring in particular, and a repulsive or attractive force of a magnet may be utilized, for example. Specifically, the clamp block 11 and the fiber clamp 17 may be provided with respective magnets, so as to change the load on the fiber clamp 17 by utilizing the fact that the repulsive force between the magnets becomes greater as the distance between the clamp block 11 and the fiber clamp 17 is shorter.

While a plurality of fiber grooves 6 are formed on the upper face of the fiber positioning part 4 of the base 3 in the above-mentioned embodiment, the present invention is also applicable to the fiber positioning part 4 having only one fiber groove 6 formed on its upper face. In this case, even when the bare fiber 5a of the optical fiber 5 misaligns its axis at the time of being contained in the fiber groove 6, enhancing the load for the fiber clamp 17 to press the bare fiber 5a can eliminate the axial misalignment of the bare fiber 5a with respect to the fiber groove 6.

REFERENCE SIGNS LIST

1 . . . optical fiber fusion splicer; 2 . . . housing; 3 . . . base for fusing; 5 . . . optical fiber; 6 . . . fiber groove; 11 . . . clamp block; 14 . . . support pin (load changing means); 15 . . . clamp auxiliary (load changing means); 16 . . . clamp spring (load imparting member, load changing means); 17 . . . fiber clamp; 18 . . . joint pin (load changing means); 19 . . . side plate (block moving unit, load changing means); 21 . . . pushup pin (block moving unit, load changing means); 22 . . . pin base (block moving unit, load changing means); 23 . . . drive unit (drive part, block moving unit, load changing means)

The invention claimed is:

1. An optical fiber fusion splicer for fusion-splicing optical fibers to each other, the optical fiber fusion splicer comprising:
   a base having a fiber groove for containing an optical fiber;
   a fiber clamp for pressing the optical fiber contained in the fiber groove against the base;
   load changing means including a drive unit for changing a load for the fiber clamp to press the optical fiber; and
   a controller detecting the number of optical fibers pressed by the fiber clamp according to an image captured by a camera and controlling the drive unit in response to the result of detection.

2. An optical fiber fusion splicer according to claim 1, wherein the load changing means has a clamp block joined to the fiber clamp so as to be movable vertically, a block moving unit for moving the clamp block vertically, and a load imparting member for providing the fiber clamp with a load corresponding to a height position of the clamp block.

3. An optical fiber fusion splicer according to claim 2, wherein the block moving unit has a pushup pin for pushing up the clamp block and wherein the drive unit moves the pushup pin vertically.

4. An optical fiber fusion splicer according to claim 2, wherein the load imparting member is a spring arranged between the fiber clamp and the clamp block.

5. An optical fiber fusion splicer according to claim 3, wherein the load imparting member is a spring arranged between the fiber clamp and the clamp block.

6. An optical fiber fusion splicer according to claim 3, wherein a height position of the pushup pin when only one optical fiber is positioned in the fiber groove is set so as to be higher than a height position of the pushup pin when the plurality of optical fibers are positioned in the fiber groove.

7. An optical fiber fusion splicer according to claim 3, wherein the pushup pin is disposed as a pair such that the fiber groove is interposed therebetween.

8. An optical fiber fusion splicer comprising:
  a base having a fiber groove configured to contain an optical fiber;
  a fiber clamp configured to press the optical fiber contained in the fiber groove against the base;
  a load changing unit including a drive unit and configured to change a load for the fiber clamp to press the optical fiber; and
  a controller detecting the number of optical fibers pressed by the fiber clamp according to an image captured by a camera and controlling the drive unit in response to the result of detection.

9. An optical fiber fusion splicer according to claim 8, wherein the load changing unit has a clamp block joined to the fiber clamp so as to be movable vertically, a block moving unit configured to move the clamp block vertically, and a load imparting member configured to provide the fiber clamp with a load corresponding to a height position of the clamp block.

10. An optical fiber fusion splicer according to claim 9, wherein the block moving unit has a pushup pin configured to push up the clamp block and wherein the drive unit is configured to move the pushup pin vertically.

11. An optical fiber fusion splicer according to claim 9, wherein the load imparting member is a spring arranged between the fiber clamp and the clamp block.

12. An optical fiber fusion splicer according to claim 10, wherein the load imparting member is a spring arranged between the fiber clamp and the clamp block.

13. An optical fiber fusion splicer according to claim 10, wherein a height position of the pushup pin when only one optical fiber is positioned in the fiber groove is set so as to be higher than a height position of the pushup pin when the plurality of optical fibers are positioned in the fiber groove.

14. An optical fiber fusion splicer according to claim 10, wherein the pushup pin is disposed as a pair such that the fiber groove is interposed therebetween.

* * * * *